United States Patent

[11] 3,588,322

[72] Inventors Karl Bartel
New Canaan;
Austin Ross, Monroe, Conn.

[21] Appl. No. 649,621
[22] Filed June 28, 1967
[45] Patented June 28, 1971
[73] Assignee Printing Developments, Inc.
New York, N.Y.

[54] KNOCKOUT MASKING TECHNIQUES
16 Claims, 4 Drawing Figs.

[52] U.S. Cl. .......... 178/5.2, 178/6
[51] Int. Cl. .......... H04n 1/38, H04n 1/46
[50] Field of Search .......... 178/5.2 (A), 6 (F,M), 6.7, 5.4 (CR), 5.4 (11), 5.2; 350/317; 355/39, 4, 7, 8, (Inquired)

[56] References Cited

UNITED STATES PATENTS 3,275,741 9/1966 Hughes et al. .......... 178/5.2

FOREIGN PATENTS 1,172,540 6/1964 Germany .......... 178/6

*Primary Examiner*—Robert L. Griffin
*Assistant Examiner*—Richard K. Eckert, Jr.
*Attorney*—Brumbaugh, Free, Graves and Donohue

ABSTRACT: In electrically producing color separations from image signals of an original, a head scans a knockout mask with colored details to derive three color component signals of which each actuates a corresponding trigger upon reaching a minimum threshold, and a "black" trigger is actuated when all three signals are minimum. Actuation of different triggers serves to replace the image signals by different sets of fixed signals causing ultimate reproduction of scanned mask details in different colors. The mask is a composite of differently color-toned black-and-white film sections.

INVENTORS
KARL BARTEL &
AUSTIN ROSS

BY Brumbaugh, Free Graves & Donohue their ATTORNEYS

INVENTORS
KARL BARTEL &
AUSTIN ROSS
BY Brumbaugh, Free
Graves & Donohue
their ATTORNEYS

KNOCKOUT MASKING TECHNIQUES

This invention relates generally to systems for electronically reproducing colored photographs or other colored subjects wherein the details of the subject are from time to time replaced in the color print by printing or other visual details derived from a knockout mask. More particularly, this invention relates to systems of such sort which enable different of the knockout mask details to be reproduced in different colors in a print.

U.S. Pat. No. 3,275,741 to Hughes et al. and copending application, Ser. No. 623,286, filed Mar. 15, 1967, in the name of Hughes et al. (and owned by the assignee hereof) disclose systems for electronically incorporating knockout mask details in an electronically derived color print of an original subject. Those earlier systems have, however, the limitation that they provide only for monochromatic reproduction of such details.

It is, accordingly, an object of this invention to provide electronic color image reproducing systems which enable different details on a knockout mask to be reproduced in different colors in a print.

Another object of this invention is to provide for knockout mask details a choice of reproducing colors which is wider than one fixed set of colors.

These and other objects are realized according to the invention by providing for an electronic color image reproducing apparatus a knockout mask of which different details thereon have different color tones so as to be differently color-coded. The mask is scanned by color-analyzing means to derive from the details on the mask a plurality of control signals of which each corresponds to a different color component of the details. Those color component signals selectively control the transmission to the color channels of the apparatus of sets of dynamically fixed signals which are derived from signal sources respective to those sets, and of which each of the different sets of fixed signals corresponds to and is the electrical analog of a respective one of a plurality of different and selectable reproduction colors for the mask details. More specifically, the color tone of each scanned mask detail serves by way of the mentioned color component signals to select a particular one of the sets of fixed signals for transmission to the color channels and, further, serves to effect replacement of the image signals normally in those channels by the selected set of fixed signals in a manner whereby the selected set of signals is adapted to effect reproduction of the scanned detail in the particular color corresponding to that set. The selection by the mentioned color component signals of different sets of fixed signals (for transmission to the color channels) enables reproduction in different colors of differently color-coded details of the scanned knockout mask.

As an aspect of the invention, while each of the different color tones used to code details on the mask is selective of one out of a set of reproducing colors for the details, the color composition of the set of selectable reproducing colors is not fixed, but, instead, is variable to permit different correlations between the color-coding of the details and the particular colors in which those details are ultimately reproduced.

As another aspect of the invention, the knockout mask is preferably comprised of a mosaic of image-bearing members of which each member is comprised of at least one local tone density detail and a background contrasting with such detail, and of which the details of the different members are differently color toned.

For a better understanding of the invention, reference is made to the following description of an exemplary embodiment thereof and to the accompanying drawings wherein.

Figures 1, 2:
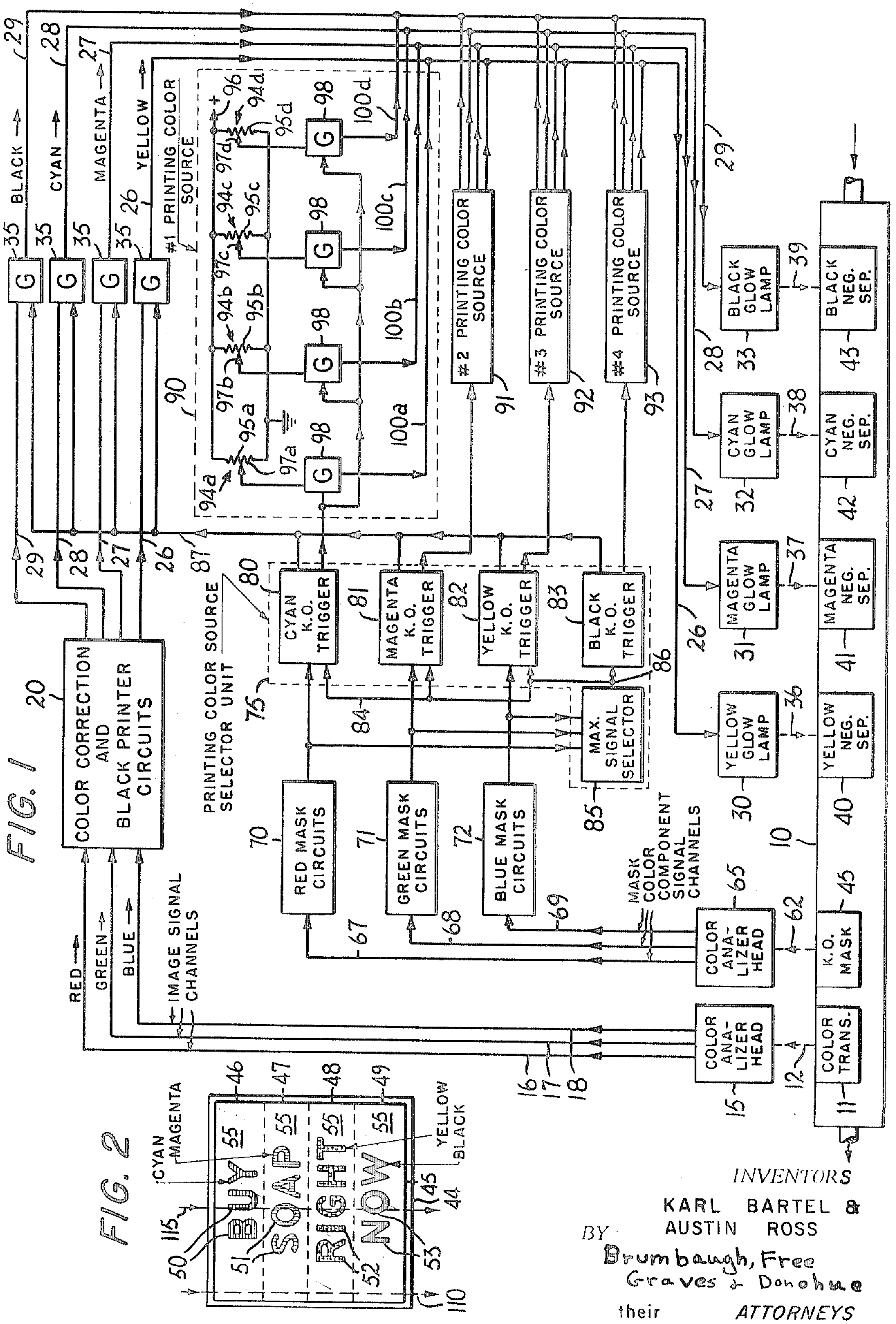
FIG. 1 is a schematic diagram of an electronic color image reproducing system in accordance with the invention.
FIG. 2 is a diagram of a knockout mask suitable for use with the system of FIG. 1.

In FIG. 1, the reference numeral 10 designates a conventional facsimile reproducing drum rotating at constant speed and simultaneously moved axially either continuously or step by step. Mounted on a transparent left-hand end of the drum is a color transparency 11 providing a color image to be reproduced, or a color opaque print. A beam of light 12 originates from within the drum and is caused by the rotary and axial motions of the drum to scan the transparency point by point and line by line, or in the case of opaque copy a suitable illuminating source is provided external to the drum. The scanning beam 12 is received by a head 15 which analyzes the light in the beam into components corresponding to red, green and blue ranges of wavelength, and which converts those light components into corresponding red, green and blue image signals each in a form of amplitude modulation on a high frequency carrier. Those red, green and blue signals are supplied by channels 16, 17 and 18, respectively, to a conventional image signal processing unit 20. Such unit includes color-correction circuits to perform color masking and undercolor removal operations on the image signals. Moreover, unit 20 includes conventional circuits which derive a black printer signal from the input signals to the unit.

The colors red, green and blue into which beam 12 is analyzed are primary colors in complementary correspondence with the primary subtractive colors cyan, magenta and yellow, respectively. In color printing, the various colors on the print are provided by inks of the subtractive colors corresponding to the complements of the colors into which the light beam from the scanned transparency is analyzed. For that reason, the signals heretofore designated as "red," "-green" and "blue" (and, also, the circuits respective to those signals) are commonly designated in the art by the terms "-cyan," "magenta" and "yellow," respectively, and such alternative designation is used herein when appropriate for purposes of clarifying the description.

The outputs of unit 20 are demodulated yellow, magenta, cyan and black image signals which flow through corresponding channels 26—29 to corresponding glow lamps 30—33. Interposed in those channels are gates 35 which normally pass the image signals.

The glow lamps 30—33 emit respective light beams 36—39 of which each is directed onto a respective one of four sheets of sensitized photographic film mounted in axially spaced relation on the right-hand end of drum 10. The rotary and axial motions of the drum causes beams 36—39 to scan over their respective sheets 40—43 synchronously with the scanning of transparency 11 by beam 12 and in a scanning pattern the same in configuration as the pattern by which the colored original 11 is scanned. For the normal condition during which gates 35 are passing the image signals, beams 36—39 are controlled by those signals to expose "yellow," "magenta," "-cyan" and "black" color component images of the original on, respectively, the sheets 40, 41, 42 and 43. The exposed sheets are then photographically processed to convert them into color separation negatives. By subsequent conventional photographic processing, the images provided by those color separation negatives are ultimately converted into images on "yellow," "magenta," "cyan" and "black" printing plates. Such plates are then inked with inks of corresponding color and are utilized in a printing press to print on paper a color print which is a reproduction of the original color image provided by the transparency 11.

As so far described, the color facsimile system of FIG. 1 is (except for gates 35) known to the art from, say, U.S. Pat. No. 3,194,883 to Ross and the patents referred to in such Ross patent. Preferably, the FIG. 1 system is transistorized. Moreover, instead of the transparency 11 being mounted on drum 10 to result in a 1:1 ratio between the size of the scanned original image and the size of the images exposed on sheets 4—43, the transparency 11 may be mounted on a scanned moving frame (as taught in U.S. Pat. No. 3,109,888 to Moe) of which the movements are synchronized with those of the drum, and which provides an enlargement ratio other than 1:1.

Turning now to the remainder of the FIG. 1 system, mounted on the transparent left-hand end of drum 10 (in axially spaced relation from transparency 11) is a knockout mask 45. The mask 45 (FIG. 2) is a composite or mosaic of four separate strips 46—49 of transparent photographic film which are maintained in assembled relation by, say, mounting all four strips on a transparent backing 44. Each of the expanses 46—49 of film is comprised of one or more local tone density details surrounded by a background which contrasts with such detail or details. In the particular mask shown in FIG. 2, the details are provided by the tone density areas 50—53 which form the words BUY, SOAP, RIGHT, and NOW in the strips 46, 47, 48 and 49 respectively. All four strips have similar background areas 55. In each of the strips, the background area is of substantially lesser tone density than the details on that strip so as to be more transparent to white light than are such details. Preferably, the background areas 55 approach as close as practical to being fully transparent.

The details 50—53 of the separate strips 46—49 are of different colors, i.e., are, respectively, cyan, magenta, yellow and black in color. It is possible to provide such differently colored details on a knockout mask by using for the mask a single piece of colored film on which all the differently colored details have been exposed, and the film has then been further processed to form a finished color transparency. Color film, however, has the disadvantage for use as a knockout mask that color film is inherently grainier than the finest grain black and white film. Also, a color film transparency is inherently incapable of providing the degree of contrast between details and background which can be realized in transparencies made from high contrast black and white film.

It is preferred, therefore, to use black and white film of small grain size for a mask and to impart different colors as desired to the details of the mask by (a) initially exposing an image of the whole mask on black-and-white film which is thereafter processed to form a black-and-white transparency representing the mask, (b) cutting up the transparency into different sections each having thereon details which are all of the same intended color but of different intended color than adjacent details of the mask, (c) color-toning each such section to impart to the details thereof the color desired therefor, and (d) reassembling the now color-toned black-and-white film sections so as to reconstitute the mask in the form of a mosaic of such color-toned sections.

The black-and-white film used in making such a mask may be, for example, a strippable or nonstrippable litho-emulsion film such as "Kodalith" manufactured by the Eastman Kodak Company, and the color-toners which are used may be commercially available "off-the-shelf" toning reagents such as those which, for example, employ nickelcadmium bromide, iron ferrocyanide and nickel nitrate as the respective color-toning materials thereof.

The color-toning of strips 46—48 has little effect on the background areas which are only slightly tinged by such toning. Hence, after the color-toning of those strips, such background areas will continue to transmit essentially white light. On the other hand, the color-toning of strips 46—48 deeply tones the details 50—52 such that light transmitted through the details 50, 51 and 52 will be relatively rich in the color components of cyan, magenta and yellow, respectively. Since the color of the details 53 on strip 49 is intended to be black to begin with, there is no need to color-tone that strip, and the details 53 are rendered black by being of high tone density so as to be opaque or almost so.

As later described in more detail, the cyan, magenta, yellow and black colors of the details 50, 51, 52 and 53, respectively, are not necessarily the colors in which those details are respectively reproduced in the color print derived from the operation of the FIG 1 system. Instead, the color in mask 45 of each detail serves primarily as a color code or key by which that particular detail is correlated with a particular color signal source selected by the color code and adapted to be set to provide any desired reproducing color for such detail over a range of such reproducing colors.

Referring again to FIG. 1, a beam of white light 62 from within drum 10 is caused by the rotary and axial motion of the drum to scan the knockout mask 45 synchronously with the scanning of original 11 by beam 12 and in a scan pattern the same as that by which the original 11 is scanned. The beam 62 is received by a color analyzer head 65 similar to head 15 in that head 65 derives from beam 62 a plurality of color control signals which are each in the form of amplitude modulation on a high frequency carrier, and which correspond to, respectively, the red, green and blue color components of the white beam 62. The so-derived "red," "green" and "blue" signals are supplied via corresponding channels 67, 68 and 69 to respective signal processing circuits 70, 71 and 72 within which such signals are each amplified, demodulated and passed through an emitter follower. The three color control signals are then supplied to a color selector unit 75.

Within unit 75, the red, green and blue color control signals are supplied to, respectively, a cyan knockout trigger 80, a magenta knockout trigger 81 and a yellow knockout trigger 82. Each of the triggers 80—82 is a conventional trigger circuit responsive to the input signal thereto only when the value of that signal attains a threshold level which is a minimum threshold in the sense that it corresponds to a low value of the light intensity of the color component represented by the signal supplied to that trigger circuit. Each trigger circuit continues, however, to respond or be "on" for all values of its input signal which are representative of light intensities of lower value than the light intensity value corresponding to the threshold level of the trigger circuit.

The three color control input signals to color selector unit 75 are also supplied to a conventional maximum signal selector circuit 85 disposed within the unit. Circuit 85 operates in a well known manner to provide on its output lead 86 that one of the input signals thereto which corresponds to the highest intensity color component of the three color components into which the lightbeam 62 is analyzed by head 65. The signal on lead 86 is in turn supplied to a black knockout trigger 83 which, like triggers 80—82, is a minimum threshold device adapted to remain "on" so long as the signal on lead 86 is representative of light intensities lower than a selected light intensity corresponding to and determined by the threshold level set for trigger 83.

The signal on lead 86 is also supplied via lead 84 to each of the triggers 80—82 to inhibit these triggers from operating when black is the color seen by head 65 on mask 45. Specifically, the signal on lead 84 renders each of triggers 80—82 capable of responding to an input signal thereto which meets the minimum threshold criterion so long as the signal on lead 84 has a value corresponding to a high or maximum light intensity represented by at least one of the red, green and blue input signals to the maximum signal selector 84. If, however, none of the input signals to selector 84 is representative of a high or maximum light intensity, then the signal on lead 86 will necessarily be representative of a low light intensity and such a signal disables triggers 80—82 from responding or being turned "on" by, respectively, the signals from circuits 70—72 when such signals are representative of minimum light intensity.

The triggers 80—83 each have an output connected to a common lead 87 which supplies a gating signal to all of gates 35 from any "on " one of triggers 80—83 during and only during the period that such actuated trigger is "on." The gating signal switches all of gates 35 during and only during that period to an "off" state which terminates the transfer through channels 26—29 of the color component image signals from unit 20.

Each of the four knockout triggers 80—83 is connected to a respective one of a plurality of color signal sources 90, 91, 92 and 93 to supply a gating signal from that trigger circuit to the corresponding source during and only during the "on" period of the trigger. The sources 90—93 are duplicate circuits. Hence, only the circuitry of source 90 need by discussed in detail.

Source 90 is comprised of four potentiometers 94*a*—94*d* having respective resistive windings 95*a*—95*d* connected between a DC voltage supply 96 and ground. The respective wipers 97*a*—97*d* of the potentiometers are connected through respective gates 98 and respective leads 100*a*—100*d* to, respectively, the yellow channel 26, the magenta channel 27, the cyan channel 28 and the black channel 29. Each of gates 98 is normally "off" to block transfer of the fixed signals from the wipers 97*a*—97*d* to the mentioned channels. When, however, the cyan trigger circuit 80 has been actuated to be "on," the gating signal from that circuit actuates all of gates 98 "on" to render those gates conductive of the fixed signals from the potentiometer wipers 97*a*—97*d* to the color channels 26—29. In the same way, the actuation to "on" of any one of the other triggers 81—83 causes the corresponding one of the sources 91—93 to supply a set of fixed signals to the mentioned color channels.

When, say, the cyan trigger 80 is actuated "on" to thereby switch gates 35 "off" and gates 98 "on," the image signals normally in color channels 26—29 are replaced by fixed signals supplied from the source 90 and fed to the glow lamps 30—33. The fixed signals so supplied from 90 by the leads 100*a*—100*d* operate in, respectively, the channels 26—29 as yellow, magenta, cyan and black color component signals of which each is dynamically fixed in value, but of which each can be set to any desired value (by adjustment of the corresponding wiper of the corresponding potentiometer) to have any value between zero and the full value within the system for that color component. Thus, by appropriate settings of the wipers 97*a*—97*d* of source 90, it is possible to select any desired combination of respective magnitude values for the fixed color component signals from such wipers. Each such combination of fixed-signal color-component magnitude values operates in the color channels 26—29 in the same way as would the same combination of image-signal color-component magnitude values to expose the separations 40—43 such that one particular overall color (which corresponds uniquely with that combination of values) is reproduced in the color print derived from the FIG. 1 system. Hence, by selectively setting the individual potentiometers of signal source 90, the fixed signals from that source may be caused to effect reproduction of any color which the image signals are capable of reproducing, namely, white, black or any of the chromatic colors which can be synthesized on the color print by the yellow, magenta, cyan and black inks used to make the print.

In other words, the signal source 90 is not only a reproducer (as later described) of cyan color-coded details on mask 45, but, moreover, determines for such details a reproducing color which is freely selectable and, hence, need not in any wise be correlated in terms of color with the cyan color-coding of those details. The only correlation existing between the cyan color-coding of details on the mask and the reproducing color determined by source 90 is that the cyan color-coding necessarily causes selection of source 90 as the one of sources 90—92 to reproduce such details and, therefore, necessarily selects whatever reproducing color (which may be any color) which the potentiometers of source 90 have been set to yield.

In like manner, each of sources 91—93 is adapted to effect reproduction in a color print of the corresponding color coded details on mask 45 in a reproducing color which is freely selectable by adjustment of the potentiometers of the source and which, therefore, need not have any correlation in terms of color with the color-coding which selects that source. That is, any one of color signal sources 90—93 can be set to provide a reproducing color which, selectively, may be white, black or any of the chromatic colors within the capabilities of the system, and the reproducing colors which sources 90—93 are respectively set to yield may be different for all the sources or the same for one or more of such sources.

The foregoing will be made clearer by consideration of the operation of the described system. In this connection, it is to be understood that the FIG. 1 system is of a character such that (a) increases in the light intensities of the color components into which beam 12 is resolved are productive of positive-going increases at the glow lamps 30—33 in the magnitudes of the image signals and corresponding increases in the light outputs of those glow lamps, and (b) increases in the light intensities of the color components into which beam 62 is resolved are productive at circuits 80—83 and 85 of positive-going increases in the magnitudes of the color control signals supplied to those circuits. It is also to be understood, however, that the invention hereof is not necessarily limited to systems characterized by that direct relation between the light intensities of the color components of the original beams and the magnitude values of signals derived from and representing such light intensities.

At a first condition of operation, assume that the beams 12 and 62 are respectively and synchronously scanning the transparency 11 and the knockout mask 45 such that beam 62 approaches and then traverses the mask 45 along the scan line 110. Inasmuch as the left-hand end of drum 10 is transparent, beam 62 before reaching mask 45 will be a maximum intensity white beam. After reaching the masks and in traversing the several color-toned sections 46—49 of the mask along the mentioned line 110, beam 62 remains essentially a white beam of maximum intensity because the beam scans only over the background areas 55 of those sections and, as stated, such areas 55 are only slightly tinged by the color-toning given to the mask sections. Such a white beam of maximum intensity is resolved by head 65 into red, green and blue color components which are each of maximum intensity. Those color components of the beam in turn yield color control signals which are all maximum at the inputs to triggers 80—83 and, therefore, are incapable of actuating any of those minimum threshold triggers. Hence, before, during and after the traversal of mask 45 by beam 62 along line 110, the knockout subsystem of the FIG. 1 system remains quiescent, gates 35 remain open, and the glow lamps 30—33 are controlled by the image signals from head 15 to expose on sheets 40—43 the details on transparency 11 which are traversed by the beam 12 during the discussed one line of scanning of the transparency.

Next, assume that transparency 11 and mask 45 are being synchronously scanned such that beam 62 scans over the mask along line 115. That line intersects the cyan U, magenta O, yellow G and black O details on the mask.

As before, both previous and subsequent to the scanning of the mask and, also, while beam 62 is scanning the background areas 55 of the mask, the knockout subsystem remains quiescent, and the glow lamps 30—33 are controlled by the image signals from head 15. During, however, the period within which beam 62 scans the cyan U, the red color component of the beam has an intensity value which is low relative to the green and blue components because cyan is "minus red."

The resulting relatively high magnitude values of the green and blue color control signals lockout the triggers 81—83 from being actuated. The red color control signal is, however, low enough in magnitude to satisfy the minimum threshold criterion for actuating the trigger 80. That trigger is, accordingly, rendered "on" for the whole period during which beam 62 is scanning the cyan U.

As described, trigger 80 when "on" closes gates 35 and opens gates 98 to, respectively, block the flow of image signals through channels 26—29 and pass the fixed signals from color source 90 to those channels. The magnitudes of such DC fixed signals are respectively set to collectively yield, say, orange as a reproducing color in the print derived from the operation of the FIG. 1 system. Hence, during the period in which beam 62 is scanning the cyan U, the glow lamps 30—33 are controlled by the fixed signals from source 90 to expose latent images of the scanned portion of the U on sheets 40—43 with respective degrees of exposure such that the latent images are adapted to cause the scanned portion to be reproduced in orange on the print. As soon, however, as the scanning of the U ceases, trigger 80 is deactuated, and the control of the glow lamps is taken over by the image signals until the next detail of the mask is scanned.

The beam 62 subsequently scans the magenta O and the yellow G of mask 45 so as to cause the beam in the two scannings to have a relatively low content of, respectively, green color component (i.e., "minus magenta") and blue color component (i.e., "minus yellow"). The scanning of the magenta and yellow mask details effects (in a manner self-evident from earlier described scanning of the cyan detail) the selective actuation of, respectively, the triggers 81 and 82 to produce replacements in the channels 26—29 of the image signals by, respectively, the set of fixed signals from color source 91 and the set of fixed signals from color source 92. Sources 91 and 92 may be set to provide pink and purple, respectively, as the colors represented in channel 26—29 by the respective sets of fixed signals from those sources. The scannings, therefore, by beam 62 along line 115 of portions of the magenta O and yellow G details of mask 45 have the ultimate results of effecting the reproduction in the color print of those scanned magenta and yellow portions in, respectively, pink and purple.

In each of the described scannings of chromatic details of mask 45, two of the three color components of beam 62 are high in intensity value to produce through circuit 85 and on leads 86 and 84 a high magnitude signal enabling actuation of the appropriate one of the minimum threshold triggers 80—82 by the color control signal thereto. Consider now, however, the scanning by beam 62 of the black O of the mask. For that scanning, all three of the red, green and blue color components of beam 62 are low in intensity value, wherefore the output signal from circuit 85 is of low magnitude to disable all of triggers 80—82 from being actuated. At the same time, because such output signal is now of low magnitude as compared to the high magnitude it had during the scanning of the chromatic details, the mentioned output signal is now enabled to and does actuate the minimum threshold trigger 83 to the "on" state to thereby cause replacement in the color channels of the image signals by the fixed signals from source 93. Accordingly, the black details on mask 45 are adapted to be reproduced in the final print in any desired color selected by the settings of the potentiometers of source 93.

Having considered two line scannings of transparency 11 and mask 45, it is evident that the product ultimately derived from the full scannings of the FIG. 1 system of elements 11 and 15 is a color print in which the mask details 50—53 appear on a background reproduction of all portions of the original color image of the transparency (except those portions which would be coextensive with the mask details) and in which, moreover, the details 50—53 are each in any desired color. Because the mask details on the final print have been derived by scanning of a mask constituted of fine grain black and white film rather than of coarse grained color film, the details are solid and uniform in color throughout and have sharp borders so to appear as though the details had been provided by all-mechanical printing. Accordingly, the FIG. 1 system is eminently suited for use in the manufacture of colored advertisements and other color printed matter in which solid color alpha-numeric characters (or other details) are superposed on colored photographs or the like, and wherein various of the mask-derived details are in different solid colors.

Figures 3, 4:
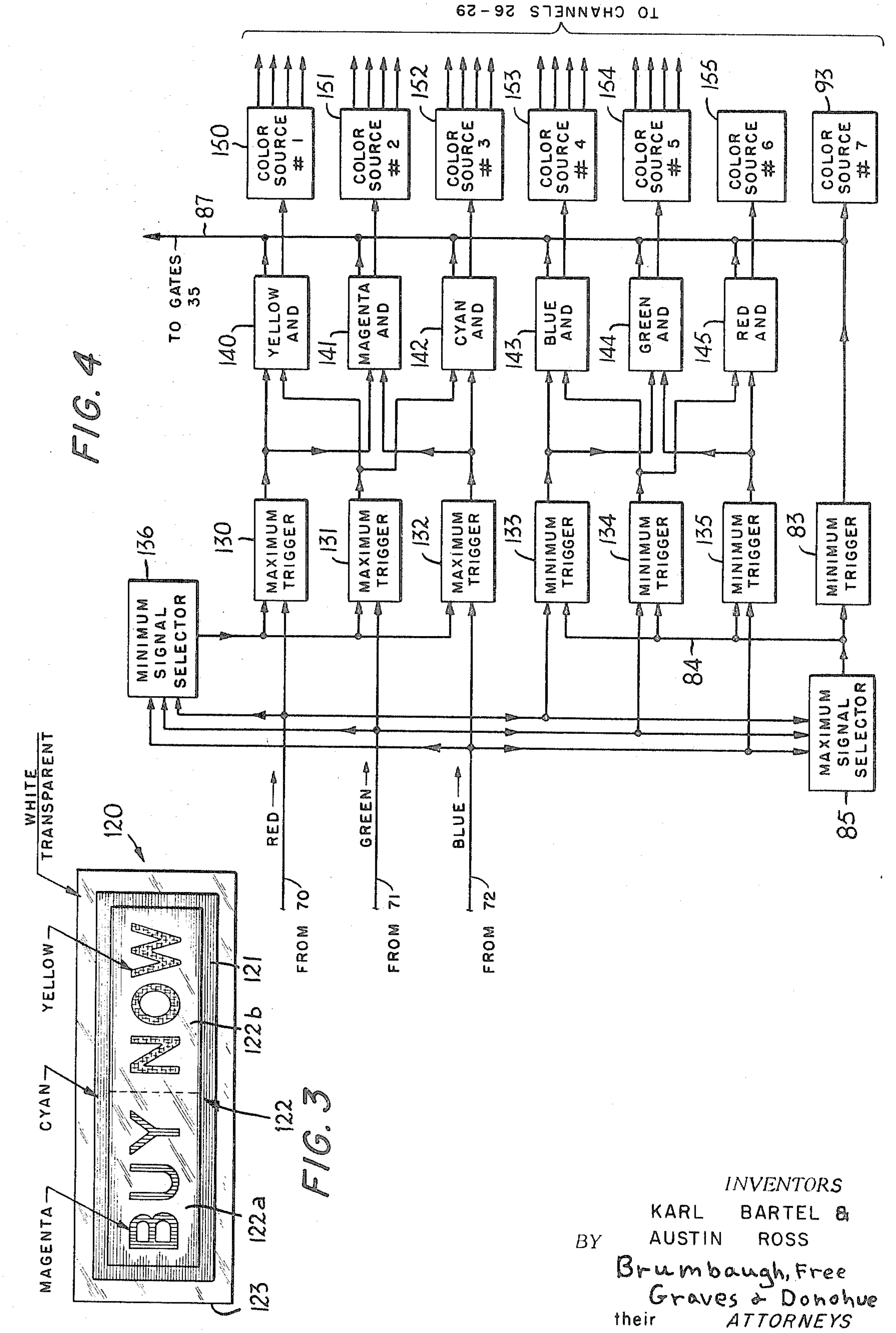
FIG. 3 is a diagram of another such mask.
FIG. 4 is a schematic diagram of a modification of the knockout subsystem of FIG. 1.

The FIG. 2 mask is a monolayer mask in that it is comprised of a single layer of mosaically assembled pieces of color-toned and untoned black-and-white film on a transparent backing. Alternatively, however, the knockout mask may be a multilayer structure in the sense of having its expanse comprised in whole or in part of two or more layers of film which is preferably fine grain high contrast black-and-white film having color-toning or no color-toning as appropriate. FIG. 3 shows such a mask 120 which is manufactured as follows.

Letters forming the phrase "BUY NOW" are photographed against a plain background to obtain (a) a right way round black-and-white negative 121 in which the letters and background are of relatively low and high tone density, respectively, and (b) a right way round black-and-white positive 122 in which the letters and background are of relatively high and low tone density, respectively. Both the negative and the positive are transparencies formed from fine grain high contrast black-and-white film of the type variously described in connection with FIG. 2.

Next, negative 121 is given a cyan color-toning treatment which only tinges the almost fully transparent letters "BUY NOW," but which gives a deep cyan toning to the background area of the negative. After color-toning, the negative is mounted as a first overlay on a transparent background sheet 123.

The positive 122 is cut up into left- and right-hand pieces **122*a* and 122*b* which bear the details "BUY" and "NOW," respectively, and those left- and right-hand pieces are then color-toned magenta and cyan, respectively. Subsequently, the film pieces 122*a* and 122*b* are mounted as shown as a second overlay on the cyan color-toned negative so that the deeply color-toned letters on such pieces register accurately with the corresponding substantially transparent letters on the underlying negative. The mask 123** is now complete.

Assume, in connection with the use of a mask 120, that the color sources 90, 91 and 92 of the FIG. 1 system are adjusted to yield the reproducing colors of, say, white, black and red, respectively. When thereafter the mask 120 is scanned in conjunction with the synchronous scanning of a transparency 11, the words "BUY" and "NOW" will be reproduced on the color print in black and red, respectively, and those two words will be surrounded by a white mortise derived from scanning of the cyan color-toned background provided by negative 121. If desired, mask 120 may incorporate areas which are color-coded black and which permit the reproduction in an additional reproducing color either of, say, another mortise or, say, additional letters which are either framed or not framed by a mortise.

FIG. 4 shows a modification of the FIG. 1 system which permits a choice during any one scanning of seven reproducing colors for the details on a color print which are derived from a knockout mask. To this end, the details on the mask itself are color-coded in the manner previously described by seven different color tones which are: red, green, blue, cyan, magenta, yellow, and black. Those seven colors (and white) when analyzed into red, green and blue color components are characterized by distributions of intensity values among their color components as indicated by the following table wherein H represents relatively high intensity value, and L represents relatively low intensity value.

COLOR-CODING vs. COLOR COMPONENT VALUES

| | Color components | | |
|---|---|---|---|
| | Red | Green | Blue |
| Color Coding: | | | |
| White | H | H | H |
| Red | H | L | L |
| Green | L | H | L |
| Blue | L | L | H |
| Cyan | L | H | H |
| Magenta | H | L | H |
| Yellow | H | H | L |
| Black | L | L | L |

Each of the above-tabulated distributions of color component intensity values is, in essence, a different permutation of a three digit binary code. Hence, it is theoretically feasible for the seven mentioned color tones which color-code the mask to each select a different reproducing color for details on the mask and, further, to reserve the color white as, in effect, a color-coding which produces no response.

The FIG. 4 subsystem provides a practical means for implementing that theoretical possibility. In FIG. 4, each of the red, green and blue color control signals from circuits 70—72 is supplied to a respective one of three maximum threshold triggers 130—132 and, also, to a respective one of three minimum threshold triggers 133—135. As before, all three of the color control signals are supplied to the maximum signal selector circuit 85 whose output is connected to the minimum trigger 83. Moreover, all three of the color control signals are supplied to a minimum signal selector circuit 136 whose principle of operation may be the same as that disclosed in U.S. Pat. No. 3,194,882 to Vincent C. Hall. The output of circuit 136 is supplied to all of maximum threshold triggers 130—132, and, analogously, the output of circuit 85 is supplied to all of minimum threshold triggers 133—135.

The outputs of the maximum threshold triggers 130—132 are supplied to three AND circuits 140—142 such that the yellow AND circuit 140 receives inputs from triggers 130 and 131, the magenta AND circuit 141 receives inputs from the triggers 130 and 132, and the cyan AND circuit 142 receives inputs from the triggers 131 and 132. Similarly, the outputs of the minimum threshold triggers 133—135 are connected to three AND circuits 143—145 such that the blue AND circuit receives inputs from triggers 133 and 134, the green AND circuit 144 receives inputs from the triggers 133 and 135 and the red AND circuit 145 receives inputs from the triggers 134 and 135. Each of AND circuits 140—145 supplies an output signal only when both triggers connected to that circuit are actuated to be "on."

The output of minimum trigger 83 is, as before, connected to color source 93 and connected via lead 87 to the gates 35 of FIG. 1. The AND circuits 140—145 have respective outputs which are all connected to lead 87 to supply a gating signal of the character earlier described to the gates 35. Moreover, the AND circuits 140—145 have additional respective outputs of which each is connected to a respective one of six color sources 150—155 which are in addition to the color source 93. Each of color sources 150—155 is a duplicate of previously described source 90 and, like that source, is adapted upon reception of an "on" gating signal from the corresponding AND circuit to supply to the channels 26—29 of FIG. 1 a set of dynamically fixed DC signals adapted to cause reproduction of mask details in a particular color selected by individual adjustment of the potentiometers of that source.

The sources 150—155 are, one at a time, selectively gated "on" (to supply signals to the channels 26—29) in a manner as follows.

From the table earlier given, it will be seen that, when a mask detail which is color-coded yellow is scanned, the scanning beam 62 will be resolved into red and green color components of high value and into a blue color component of low value. It follows that, during the scanning of such detail, the maximum threshold triggers 130, 131 and the minimum threshold trigger 135 will each be actuated "on," but the other triggers will remain "off."

The AND circuits connected to the outputs of triggers 130, 131 and 135 are the circuits 140, 141, 142, 144 and 145. Of all such AND circuits, however, only the yellow AND circuit is connected to two out of three of the triggers 130, 131 and 135. As stated, each of the AND circuits 140—145 is rendered "on" only during coincidence of the "on" states of each of the two triggers connected thereto. Hence, the effect of scanning the yellow color-coded mask detail is to selectively cause only the yellow AND circuit 140 to be "on" during the period over which that detail is scanned. As long, however, as AND circuit 140 is "on," it both switches gates 35 "off" and its associated color source 150 "on" to produce replacement in channels 26—29 of the image signal from head 15 by the fixed signals from source 150. The effect of such replacement is to implement the reproduction in the final color print of the scanned yellow detail in the reproducing color for which source 150 is set.

As indicated by the foregoing table, mask details which are color-coded magenta and cyan, respectively, will yield beams 62 having, respectively, a high content of both the red and blue color components and a high content of both the green and blue color components with, in each case, the other color component being low in intensity value. Accordingly (and by ways analogous to those described in connection with the scanning of a yellow detail), the scanning of a magenta mask detail causes AND circuit 141 to be rendered "on" by actuation of triggers 130, 132 to thereby exclusively enable source 151 to transmit fixed signals (in lieu of image signals) to channels 26—29, and the scanning of a cyan mask detail causes AND circuit 142 to be rendered "on" by actuation of triggers 131, 132 to thereby exclusively enable source 152 to supply fixed signals (in lieu of image signals) to the channels 126—129.

The minimum signal selector circuit 136 acts to inhibit actuation of any of triggers 130—132 in the instance when the area scanned by beam 62 has maximum transparency or is only slightly color tinged so that the beam is white or essentially so. More specifically, when at least one of the three color components of beam 62 is of low intensity (as where a mask detail being scanned is color-coded yellow, magenta or cyan), the circuit 136 supplies to triggers 130—132 an output enabling each of those triggers to be actuated by the color control signals respectively supplied thereto when the signal in question is of high enough magnitude. When, however, beam 62 is white, none of its red, green and blue color components is of low intensity, and, in those circumstances, the output of circuit 136 changes to disable all of triggers 130—132 from being actuated.

Turning now to mask details which are color-coded red, green or blue, a scanned blue color-coded mask detail will evidently cause beam 62 to have a high content of blue color component and low content of each of the green and red color components. It follows that the color control signals derived from beam 62 will produce an "on" state of each of the maximum threshold trigger 132 and the minimum threshold triggers 133 and 134. Of all the AND circuits 140—145, however, only the blue AND circuit 143 is connected to two out of such three actuated triggers 132, 133 and 134. Hence, the scanning of the blue mask detail results in an exclusive rendering "on" of color source 153 to supply fixed signals (in lieu of image signals) to the channels 26—29 over the period of scanning of the blue detail.

From the description just given and from the table of color component value distributions corresponding to different color-codings, it will be evident that, in like manner, the scannings of green and red color coded details will effect exclusive selections of, respectively, the color sources 154 and 155 to supply fixed signals in lieu of image signals to the channels 26—29.

The maximum signal selector 85 and the minimum threshold trigger 83 serve (as described in connection with FIG. 1) to select color source 93 as the exclusive source for reproducing signals in the instance where a black mask detail is being scanned. Moreover, circuit 85 serves in that instance (when all three of the red, green and blue color components of beam 62 are of low value) to supply via lead 84 to triggers 133—135 a signal which disables all of those triggers from being actuated. When, on the other hand, a scanned mask detail has any of the mentioned color-codings other than black, at least one of the color components of beam 62 will be of high intensity value, and the corresponding high magnitude signal will be transmitted through maximum signal selector 85 and (as a gating signal) to triggers 133—135 to enable actuation of each of such triggers by the corresponding color control signal when the latter signal is of low enough magnitude.

The above described embodiments being exemplary only, it is to be understood that additions thereto, modifications thereof and omissions therefrom can be made without departing from the spirit of the present invention, and that the invention hereof comprehends embodiments differing in form and/or detail from those which have been specifically described. For example, the invention is readily adaptable to systems employing knockout masks providing opaque backgrounds for mask details to be reproduced. Further, the particular subsystems shown in FIGS. 1 and 4 for selecting color sources as a function of the color-coding of mask details are, in essence, decoding matrices and are only two of a wide variety of decoding matrices which can be used for that purpose. Still further, the invention is not necessarily limited to systems for electronically producing photographic color separations of an original colored subject, but, rather, the invention extends to any electronic color system wherein color component images are derived from a common original color image and wherein details of the original color image are replaced from time to time in the color component images by details derived from a knockout mask.

Accordingly, the invention is not to be considered as limited save as is consonant with the recitals of the following claims.

We claim:

1. In apparatus in which a colored original image is scanned to develop image signals in different color channels, and a synchronous scanning of details provided by a knockout mask is productive of replacement in said channels of said image signals by signals representative of said details, the improvement comprising, color analyzing means responsive to scanning of details on said mask to derive a plurality of mask color component control signals of variable magnitude representative of said details, a plurality of signal sources each providing a set of dynamically fixed signals for said channels and each corresponding to a different color collectively represented by the set of fixed signals respective to that source, signal transfer means providing transmission paths to said channels for the signals from said sources, and detail color selector means selectively responsive to predetermined magnitudes of said mask color component control signals derived from scannings of mask details to control the transmission of signals in said paths so as to select different of said sources to supply fixed collectively color representative signals transmitted to said channels and to render said fixed transmitted signals representative of said mask details, said selector means comprising means to compare the relative magnitudes of ones of said mask color component control signals, and means to selectively control by said comparing means the transmission to said channels of the fixed signals from at least one of said sources.

2. The improvement as in claim 1 in which said selector means comprises a plurality of knockout trigger circuits each corresponding to a respective one of said sources and each responsive to attainment of a threshold condition by at least one of said mask color component control signals to selectively control the transmission to said channels of the fixed signals from the corresponding source.

3. The improvement as in claim 2 in which said threshold condition is a threshold value representative of a relatively low intensity of the color component represented by such control signal.

4. The improvement as in claim 1 further comprising means to adjustably and selectively set the value of each fixed signal in the set provided by each of said signal sources so as to permit by such selective setting a variation over a range in the color collectively represented by each such set of fixed signals.

5. In an image scanning system in which a first light beam scans point-to-point an original continuous tone image comprised of first areas with a common tonal characteristic and of second areas differing in tonal characteristic from said first areas, and in which a continuous tone image is exposed on a photosensitive sheet by a corresponding scanning point-to-point of said sheet by a second beam provided by beam-generating means, the improvement in which said original image is a knockout mask in which said first areas are chromatic areas differing in primary color component composition from said second areas, said improvement further comprising, means to split light derived from said scanning of said mask by said first beam into a plurality of color component beams each constituted of light respectively corresponding to a different one of a plurality of different color components into which the color on said mask may be analyzed, a plurality of photoelectric transducer means each responsive to the light in a respective one of said color component beams to convert such light into a respectively corresponding one of a plurality of electrical color component signals of variable magnitude, logic circuit means controlled by selected magnitudes of said color component signals to produce at least one electrical control signal having "on" and "off" values, respectively, upon scanning of one and the other of said first and of said second areas, source means of at least one operably constant energy signal, signal transfer means for supplying such constant energy signal to said beam-generating means to maintain constant the intensity of said second beam while such energy signal is so being supplied to said last-named means, and electronic gating means incorporated in said signal transfer means and selectively responsive to one and the other of said "on" and "off" values of said on-off control signal to establish and interrupt, respectively, the signal supply path for said constant energy signal through said transfer means and to said beam-generating means; said logic circuit means comprising at least one AND circuit selectively responsive to concurrence and nonconcurrence of a plurality of separate electrical conditions established by said color component signals to produce, respectively, said "on" values and said "off" values of said control signal.

6. A system as in claim 5 in which there are at least three of said color component signals, and in which said logic circuit means further comprises a plurality of signal-actuated circuits each responsive to a different pair of said color component signals to produce an output only in the presence of a predetermined selective relation attained by the two input signals thereto in the respective magnitudes of such two signals, said output from each of said signal-actuated circuits providing a respective one of said electrical conditions.

7. In a system in which a colored original image is scanned to develop a plurality of image signals and in which a knockout mask is synchronously scanned to develop signals representative of different details on said mask, the improvement comprising a plurality of signal sources each providing a set of reproducing color component signals of which each corresponds to a different one of said image signals, and a subsystem responsive to scanning on said mask of details with different color codings to actuate different corresponding ones of said sources to replace ones of said image signals by, respectively, the corresponding ones of the set of reproducing color signals provided by the actuated source, said subsystem comprising a unit which analyzes the colors of color-coded details on said mask into a plurality of mask color component signals of variable magnitude, said subsystem being further comprised of a decoding matrix having a respective input for each of said mask signals and a plurality of outputs of which each is coupled to a respective one of said sources and corresponds to a respective one of a plurality of different permutations in the magnitudes of said mask signals, said matrix being responsive to the occurrence of each of said plurality of different permutations to produce at the corresponding output a signal which actuates the source coupled to that output.

8. A system according to claim 7 in which ones of said plurality of permutations are formed of magnitudes of said mask signals which are distributed between relatively high and relatively low ranges of predetermined magnitude for such mask signals.

9. A system according to claim 7 in which at least one of said plurality of permutations is formed of mask signal magnitudes which are all within the same predetermined range of magnitude for said mask signals.

10. A system according to claim 8 in which said matrix is responsive to a permutation of mask signal magnitudes which are all within the same predetermined range of magnitude to inhibit the production of actuating signals at outputs of said matrix corresponding to permutations of mask signal magnitudes distributed between said high and low ranges.

11. A system according to claim 7 in which said matrix is selectively nonresponsive to at least one permutation of mask signal magnitudes which is formable by said mask signals.

12. A system according to claim 7 in which said unit analyzes the colors of color-coded details on said mask into at least three different mask color component signals of variable magnitude.

13. A system according to claim 7 in which each of said signal sources provides a set of reproducing color component signals of which each is dynamically fixed in value.

14. A system according to claim 13 in which each such set of dynamically fixed signals is adjustable in value.

15. A system according to claim 14 in which, in each such set of dynamically fixed signals, each signal is adjustable in value independently of the adjustment in value of the other signals in that set.

16. A system according to claim 13 in which the set of dynamically fixed reproducing color component signals provided by at least one of said sources is collectively representative of a color different than the color on said mask serving to produce actuation of that source.

PO-1050
(5/69)

UNITED STATES PATENT OFFICE
CERTIFICATE OF CORRECTION

Patent No. 3,588,322 Dated June 28, 1971

Inventor(s) Karl Bartel and Austin Ross

It is certified that error appears in the above-identified patent and that said Letters Patent are hereby corrected as shown below:

Col. 2, line 70, "4-" should be --40--; and

Col. 10, line 36, after "on" insert --of AND circuit 143 and, consonantly, the exclusive gating "on"--.

Signed and sealed this 21st day of March 1972.

(SEAL)
Attest:

EDWARD M.FLETCHER,JR.
Attesting Officer

ROBERT GOTTSCHALK
Commissioner of Patents